Sept. 12, 1933.   V. D. POPOV   1,926,914

CONVEYING DEVICE

Filed July 29, 1931

V. D. Popov
INVENTOR

By: Marks & Clerk
Attys.

Patented Sept. 12, 1933

1,926,914

UNITED STATES PATENT OFFICE 1,926,914

CONVEYING DEVICE

Vladimir Dmitrijevič Popov, Prague, Czechoslovakia

Application July 29, 1931, Serial No. 553,832 and in Czechoslovakia August 23, 1930

5 Claims. (Cl. 198—209)

This invention relates to a new and improved device for the conveying of divided or measured off quantities of a substance or an article from an apparatus which delivers these quantities or portions, e. g. an automatic weighing machine, to an apparatus which works up or otherwise deals with these quantities, e. g. a packing machine. In the mechanical working up or treatment of measured quantities of a substance it is absolutely necessary that these quantities be delivered or brought up to the machine concerned, e. g. a packing machine, uniformly at certain perfectly regular intervals of time. The uniform delivery of certain types of material and goods, particularly such as do not readily permit of being poured, in quantities of given weight to a machine for further dealing with these quantities involves considerable techical difficulties. A uniformly timed functioning of the weighing process with an automatic weighing machine can be obtained only by the use of complicated technical expedients, always entails a sacrifice of accuracy in the weighing, and finally demands constant and careful tending of the machine.

The present invention has for its object to provide an automatically operating conveying device which delivers the measured quantities derived from any type of apparatus, e. g. an automatic weighing machine, not directly by means of receptacles to the machine in which the said quantities are further dealt with, but collects a plurality both of the filled receptacles and of the empty receptacles in reserve, so that a supply of receptacles is kept in readiness for both the measuring and the working apparatus to which they are passed on as required thus enabling differences in rate of working to be neglected.

An example of the carrying out of the invention is illustrated in the accompanying drawing, in which.

The conveying device according to the invention consists essentially of a constantly rotating driving or transporting member, which can take the form of a wheel, an endless belt, or any other suitable uninterrupted movable unit, and of a plurality of receptacles for the quantities to be conveyed, these receptacles being adapted to be set in motion by the above mentioned driving or transporting member, along a closed path. The connection of the receptacles to the rotating transporting member is such that the receptacles can be arrested and set in motion as required in the simplest possible manner by the interposition and withdrawal of suitable obstacles in the path of the said receptacles.

Figure 1:
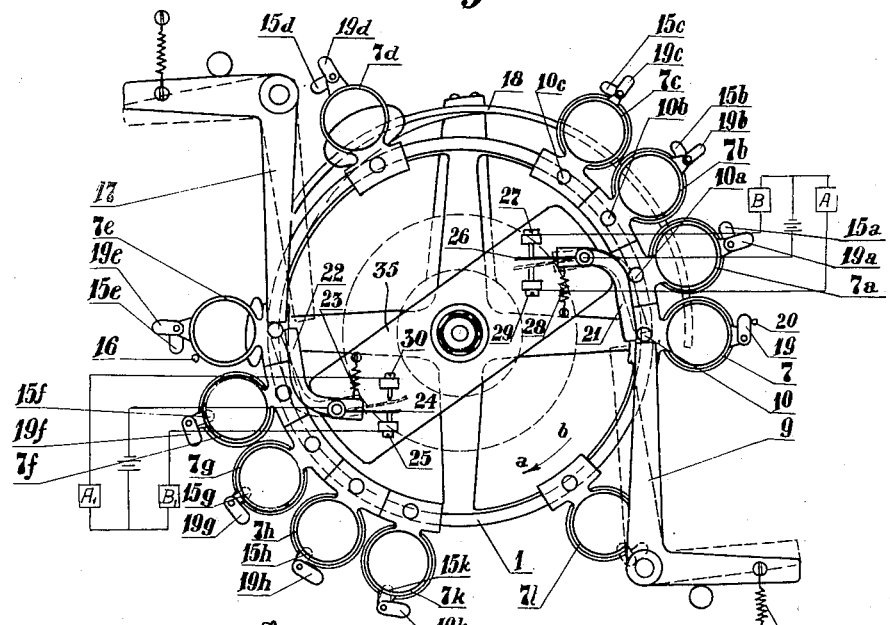
Fig. 1 shows a plan view of the conveying device.
Figure 2:
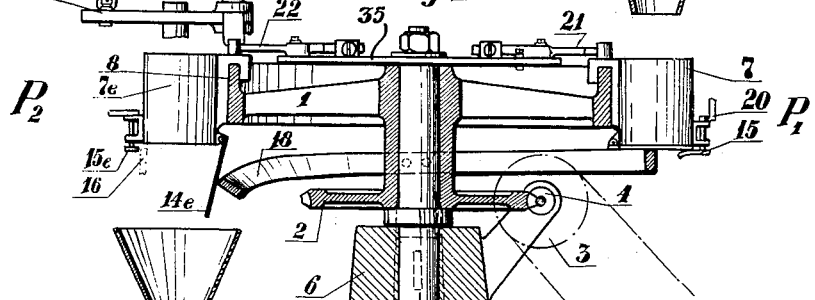
Fig. 2 is a section of the same.
Figure 3:
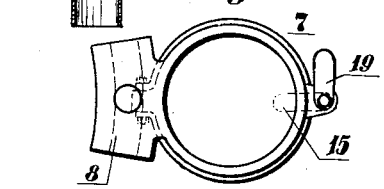
Figs. 3 and 4 show one of the receptacles of the conveying device, in plan view and longitudinal section respectively.
Figure 4:
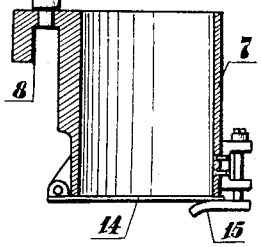

The constructional example shown in the drawing comprises a transporting member in the form of a wheel 1 which is in one piece with the worm wheel 2 (see Figs. 1 and 2). The wheel 1 is driven by means of the pulley wheel 3, the worm 4, and the worm wheel 2, so that a continuous rotating motion is imparted to the wheel 1 about the spindle 5 which is mounted in the stand 6. On the periphery of the wheel 1 there is provided a slipping and transporting rim from which the receptacles 7, 7a, 7b, etc., are suspended by means of their grooves 8 (Fig. 3 and 4).

The above described connection between the transporting member and the receptacles is only taken as one possible example for this connection which can be effected in a great variety of ways.

The receptacles thus arranged on the rim 1 are transported by virtue of friction, and travel on a circular path about the spindle 5. If any mechanical obstacle be interposed in the path of the receptacles, the first of the receptacles to encounter this obstacle will be prevented from travelling in company with the transporting member, and the following receptacles will likewise be arrested. If this obstacle be then withdrawn, the receptacle thereby released will be taken by the revolving transporting member, and thus conveyed along the endless path. It will be clear that by the interposition of an obstacle first one receptacle is arrested and then in succession the subsequent receptacles. The possibility is thus provided, by the provision of controllable obstacles at selected points on the path, of collecting a reserve supply both of filled and of empty receptacles, and of liberating the same for conveyance as required.

The details of the conveying device, and its mode of operation, will now be described, the apparatus from which the divided quantities of a substance are derived being taken, by way of example, to be a weighing machine, and the apparatus for the subsequent working up or treatment of the said quantities being taken, by way of example, to be a packing machine.

The material or goods destined for packing, which is weighed by hand or in an automatic weighing machine, passes into the hopper 11 (Fig. 2) which is arranged at the point P₁ on the path of conveyance. From the hopper 11 the material falls in consequence of its own weight into the receptacle positioned at $P_1$. As soon as the whole of the portion of material has fallen into the said receptacle, the lever 9 is rocked either automatically in conjunction with the weighing machine or by hand from the position in which it is shown in full lines in Fig. 1 into the position in which it is shown in broken lines in the same figure, and thus liberates the receptacle 7. This receptacle is transported by the rim of the wheel 1, and travels about the spindle 5 in the direction of the arrow $a$—$b$ to the position $P_2$. As soon as the receptacle 7 has left the position $P_1$, the lever 9 is returned either automatically as by spring 12 or by hand to its initial position, and presents its end to be encountered by the stop $10a$ on the next receptacle $7a$; it arrests this receptacle and the subsequent receptacles on the rim of the transporting wheel.

It will be clear that two receptacles, for instance the receptacles 7 and $7a$, can also be filled simultaneously at the position $P_1$. In this case the material is delivered from two automatic weighing machines through two hoppers positioned above the receptacles. The lever 9, and the stops 10, $10a$, etc., must in this case be so arranged that two filled receptacles are released at a time.

After liberation of the receptacle 7 by the lever 9, this receptacle 7 travels at a certain distance from the receptacle $7l$ which in Fig. 1 is shown at an intermediate position in the course of its movement from $P_1$ to $P_2$. As soon as the receptacle $7l$ reaches the receptacle $7k$, the receptacle $7l$ is brought to rest in contact with the receptacle $7k$, and thereafter the receptacle 7 with the receptacle $7l$, and similarly in succession the following receptacles each in contact with the preceding receptacle in their order of arrangement. These receptacles thus crowded up to each other to form a reserve supply are liberated consecutively and transported in the direction of the arrow $a$—$b$ to the position $P_2$ where the material is passed on to the packing machine.

The pouring out of the material at $P_2$ into the hopper 13 and thence into the packing machine (not shown) is effected by the opening of the bottom 14, $14a$, etc., of the receptacles 7, $7a$, etc. As long as the receptacles are travelling from the position $P_1$ to the position $P_2$, they are closed at the bottom by the latches 15, $15a$, $15b$, etc., (Fig. 2). As soon as any one of the containers, e. g. the receptacle $7e$, arrives at the position $P_2$, the latch $15e$ is swung round by the action of the fixed stop 16 (Figs. 1 and 2) and liberates the bottom. The material drops out of the receptacle into the hopper 13, and passes thence into the packing machine which, after each operating cycle dealing with one portion of material, actuates a stop lever 17 similar to the lever 9. This actuation is carried out at regular intervals of time corresponding to the working period of the packing machine. The receptacles $7e$, $7f$, etc., are thus emptied at regular intervals in the position $P_2$, and the measured quantities of material are delivered at regular intervals to the packing machine. The empty receptacles liberated by the stop lever 17 are transported by the rotating member 1 from the position $P_2$ into the position $P_1$, the receptacle $7d$ being shown in Fig. 1 in an intermediate position on this part of the course. On the way from $P_2$ to $P_1$ the floors of the receptacles are closed in succession by the action of a stationary closing member 18 which is attached to the stand 6. In the position $P_1$ the floors of the receptacles, which are already in the closed condition, are locked by the latches 15, $15a$, etc., the upper arms 19, $19a$, $19b$, etc., of which are caused to co-operate for this purpose with a fixed stop 20.

From the above description it will be clear that even when at the position $P_1$ the measured quantities of material are deposited in the receptacles at intervals which are not perfectly equal, these measured quantities are nevertheless delivered to the packing machine at the position $P_2$ at perfectly equal intervals of time. It is obvious that the average output of the automatic weighing machine, e. g. in the minute, must approximately correspond to that of the packing machine, approximate conformity in this sense being easily attainable by adjustment of the respective machines.

It is nevertheless possible, for a number of reasons, for the reserve supply of empty receptacles at $P_1$ or of full receptacles at $P_2$ to become exhausted. In order that in such circumstances neither the automatic weighing machine nor the packing machine shall run idle, the present conveying device is provided with automatically operating checking devices 21 and 22 which serve to stop these machines automatically when the supply of receptacles at $P_1$ or at $P_2$ falls below a certain minimum number, and to restart them when the supply becomes sufficient.

The checking devices 21 and 22 each consist of a feeler lever one arm of which is acted upon by a spring. The other arm of this lever is adapted to co-operate with stops 10, $10a$, $10b$, etc., on the receptacles (see Fig. 1). If there are receptacles at $P_1$ the feeler lever 21 will be retained by the stops 10, $10a$, etc., in the normal position in which it is shown in full lines in Fig. 1, that is to say in opposition to the action of the spring 28. In this position of the lever contact may for example, as shown in the drawing, be established between the spring 26 and the screw 27. By this means, as can be seen from Fig. 1, any known electric means B which sustain electrically the operation of the automatic weighing machine are switched on. If all the receptacles at $P_1$ have been used up, the feeler lever 21 is brought by the action of the spring 28 out of its normal position into the position indicated in broken lines and closes, for example, by means of the contacts 26 and 29 the electric current circuit of any known device A designed to stop the working of the automatic weighing machine. The device 22 at $P_2$ is constructed in a similar manner, being provided with a spring 23 and contacts 24, 25, and 30. Precisely as with the device 21, the device 22 ensures the continued operation of the packing machine, for example by means of the device $B_1$, as long as there are full receptacles at the position $P_2$, and interrupts the operation of this machine by means of the device $A_1$ as soon as the supply of receptacles is exhausted.

As will be understood from the above description, the stopping and starting of the automatic weighing machine and of the packing machine is effected by the rocking movements of the feeler levers 21 and 22 which bring into action the electric devices A, $A_1$, or B, $B_1$. It will be clear without further explanation that the movements of these feeler levers can be utilized mechanically for the direct stopping of the automatic weighing machine or of the packing machine; a form of construction embodying this variation is however not shown in the drawing.

The feeler levers 21 and 22 can also be arranged at other positions than at $P_1$ and $P_2$ at which latter positions they effect the stopping of the automatic weighing machine or of the packing machine only after the supply of receptacles is exhausted, and may for example be disposed at a certain distance in front of the positions $P_1$ and $P_2$, so that the automatic stopping of the weighing machine and of the packing machine is effected before the supply of receptacles at $P_1$ and $P_2$ is completely exhausted and is merely reduced to a predetermined minimum. In the form of construction shown in the drawing, the two checking devices 21, 22 are provided on a carrier 35 adapted to be adjusted and fixed in any desired position on a circle, i. e. along the path of conveyance.

The present device for the conveyance of measured quantities of material from one or more automatic weighing machines to a packing machine thus functions in such a manner that receptacles with material are stored up in reserve, and that the material is transferred from these receptacles to the packing machine at certain moments; further, the device stores up the empty receptacles in front of the position on the conveying track at which these receptacles are filled with material. The present device thus enables irregularly working automatic weighing machines to be functionally combined with a regularly working packing machine.

It is self-evident that, in spite of the provision of automatically working regulators or feeler levers 21 and 22, the mean average output of the automatic weighing machine and the output of the packing machine must be so brought into conformity that the automatic arresting of these machines by the feeler levers 21 and 22 only occurs as a matter of exception, that is to say, for example, when the whole of the material which has been placed in the automatic weighing machine or the like is exhausted.

What I claim is:—

1. Apparatus for the conveyance of weighed or measured off quantities of material from a filling machine to a receiving machine operating non-synchronously with the filling machine, including a continuously moving transporting wheel provided with a slip-and-take rim on its periphery, a plurality of receptacles including coupling means for connection to the slip-and-take rim of the transporting wheel and stops engaging in the closed moving path of the receptacles, the said stops temporarily interrupting the conveyance of the receptacles by the slip-and-take rim at the filling and discharging points and enabling, after the filling and discharging, the conveyance of the receptacles from the filling point to the discharging point thereof and back again by the slip-and-take rim.

2. Apparatus according to claim 1, and in combination therewith separate means for maintaining the operation of the machines and rendering the machines inoperative, and control feeler levers provided at the points where the filling and discharging of material take place on the non-synchronously operating machines, for contacting with the receptacles passing outside the same and maintaining by said means the operation of the corresponding machine when there is a sufficient supply of vessels, but when the supply of vessels is consumed, that is to say, when the contact of the feeler lever with the receptacle is interrupted this machine is rendered inoperative until the supply of receptacles is renewed and the contact with the receptacles is again established.

3. Apparatus according to claim 1, wherein control feeler levers are adjustably arranged along the path of conveyance, substantially as and for the purposes set forth.

4. Apparatus for the conveyance of divided or measured off quantities of a substance or article from a feeding machine to a receiving machine, comprising a closed transporting member in the form of a rotatable slip-and-take rim, a plurality of receptacles carried by said transporting member and adapted to rotate therewith, said receptacles including coupling means adapted to engage said rim, and means for maintaining a number of said receptacles in a position of rest when said transporting member is rotating.

5. Apparatus as claimed in claim 4, wherein the slip-and-take rim of the transporting member is of annular construction.

VLADIMIR DMITRIJEVIČ POPOV.